Patented Mar. 20, 1923.

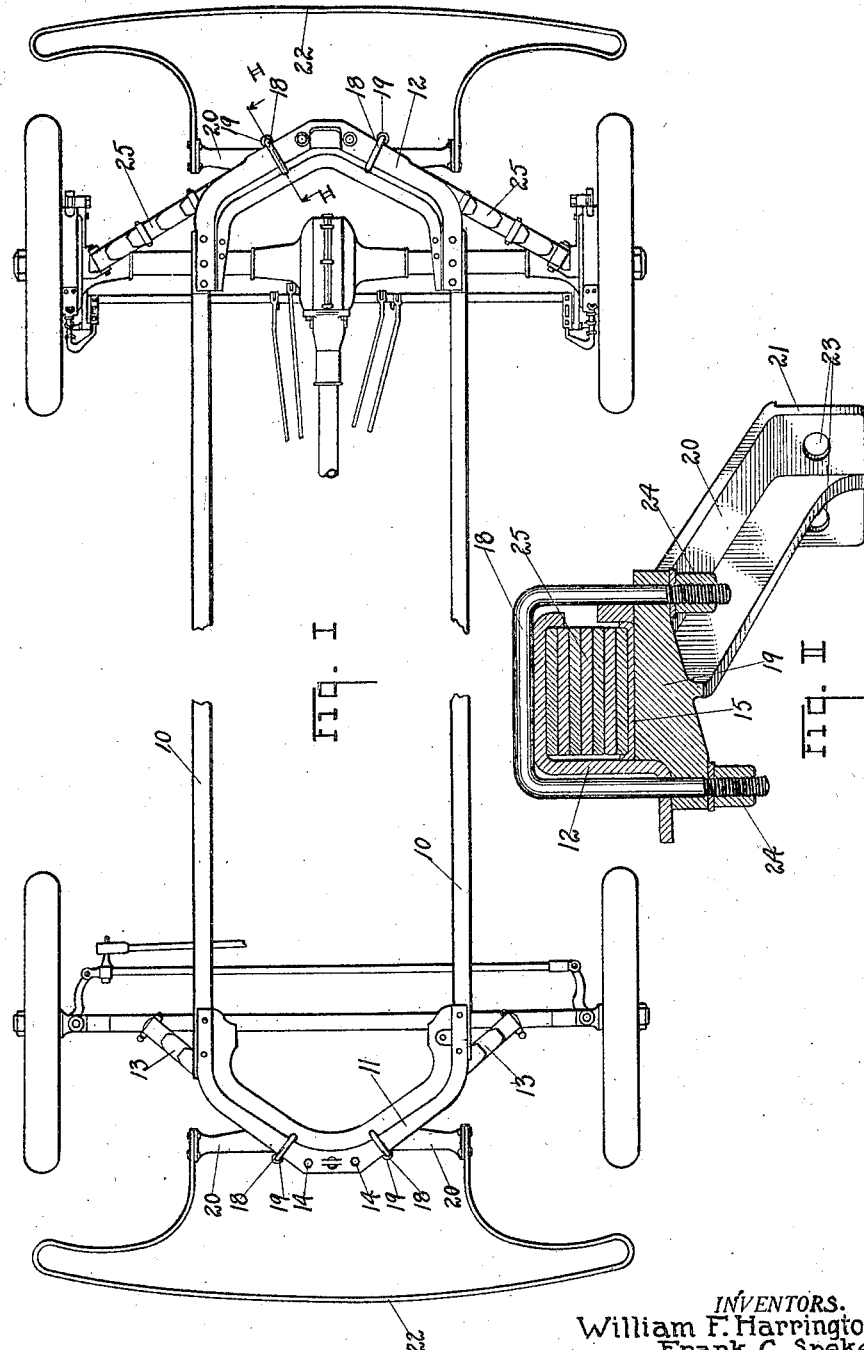

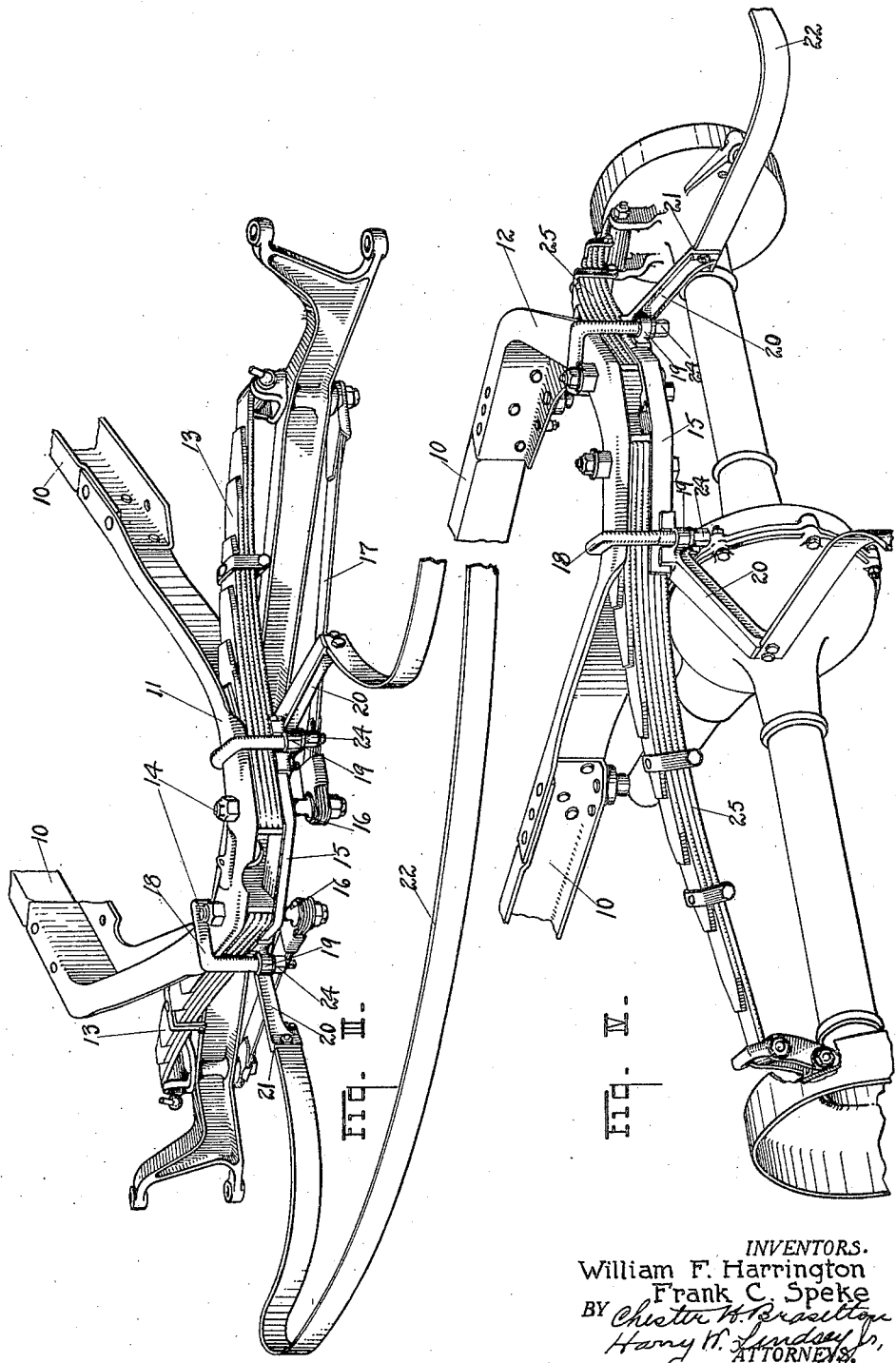

1,448,801

UNITED STATES PATENT OFFICE.

WILLIAM F. HARRINGTON AND FRANK C. SPEKE, OF TOLEDO, OHIO, ASSIGNORS TO THE WILLYS-OVERLAND COMPANY, OF TOLEDO, OHIO, A CORPORATION OF OHIO.

AUTOMOBILE BUMPER.

Application filed August 26, 1920. Serial No. 406,073.

*To all whom it may concern:*

Be it known that we, WILLIAM F. HARRINGTON and FRANK C. SPEKE, a citizen of the United States and a subject of the King of Great Britain, respectively, residing at Toledo, county of Lucas, State of Ohio, have invented certain new and useful Improvements in Automobile Bumpers, of which we declare the following to be a full, clear, and exact description.

This invention relates to improvements in automobile fenders or bumpers but more especially to improvements in brackets for supporting such fenders.

One object of the invention is the provision of means for mounting fenders upon automobiles of the type in which the side members at each end of the frame converge approximately to a point and extend beyond the adjacent axle, and in which the springs are attached to the pointed extremity and extend outwardly in a diagonal direction to the axle. This form of construction is known in the art as three-point spring suspension.

Another object of the invention is the utilization of the spring clips which comprise part of the means for attaching the spring to the frame, as the fender bracket attaching means also.

A further object of the invention is the provision of a bracket upon an automobile of the type specified which will accommodate a fender of the ordinary kind intended for attachment direct to the usual type of frame.

Other objects, and objects relating to details of construction and economies of manufacture, will appear as we proceed with the description of that embodiment of the invention which, for the purposes of the present application, we have illustrated in the accompanying drawing, in which:

Figure I is a plan view of the chassis of an automobile showing fenders embodying our invention attached thereto both front and rear.

Fig. II is a detail, cross-sectional view showing one of the brackets for the fender in position, the section being taken substantially on the line II—II Figure I.

Figure III is a perspective view of the forward axle and adjacent portion of the frame with a fender embodying our invention attached thereto.

Figure IV is a similar view of the rear axle and adjacent portion of the frame with a fender secured thereon.

Similar reference characters refer to like parts throughout the views.

In the drawings 10 represents side frame members which are connected by forward and rear transverse members 11 and 12 respectively. These members are heavy steel stampings and are roughly Z-shaped in cross section (see Figure II).

The springs of the vehicle are four in number and each is pivoted at its small end to one of the axles, while at its large end it is rigidly mounted in one of the end members of the frame near the middle of the latter. This type of spring suspension is referred to herein as three-point suspension. The pivotal connections are well illustrated in Figures III and IV but are not herein particularly described as they form no part of the present invention.

The end frame pieces 11 and 12 have their sides converging as shown. The forward springs 13 extend underneath the converging portions of the end piece 11 to which they are secured preferably by means of bolts 14 which pass through the upper portion of the piece 11, through holes in the successive leaves of the spring, and through holes in a spring retainer 15. The latter is a metal plate having upturned flanges along its front and rear sides and shaped to receive the springs 13. Below the retainer 15 the bolts 14 extend through spacing collars 16 and then through the terminals of lower springs 17. Nuts are threaded upon both ends of the bolts 14.

An additional securing means for each spring consists of a U-shaped spring clip 18 which is inverted and caused to straddle the upper portion of the end piece 11, the rear arm however extending through a hole in the lower and inner flange of the end piece as shown in Fig. II. The ends of the clip 18 pass through holes in a clip plate 19 which is preferably a forging and which is provided with an extension 20 having at its free extremity a flat vertical wall 21 against the outside of which one leg of a fender 22 may rest and to which the said leg may be attached by means of bolts passing through holes 23 all as clearly illustrated in Fig. II. As will appear from Fig. I the extensions 20 are of such length as to terminate substantially in the same vertical planes with the side members 10 of the frame so that a bumper of any ordinary construction may be used. Nuts 24 are threaded upon the extremities of the clip 18, thus clamping together firmly the frame end piece 11, the spring 13, the spring retainer 15 and the clip plate 19. The fastenings and brackets are alike upon both sides.

The rear springs 25 are secured to the frame in precisely the same manner as the front springs and the brackets 20 are of the same form and are supported in the same way as in the case of the forward brackets. Hence a separate description is unnecessary.

We are aware that our invention above described and illustrated in the accompanying drawings is susceptible of various modifications without departing from the spirit thereof and therefore we desire to claim the invention broadly as well as specifically as indicated in the appended claims.

We claim as our invention:

1. In combination, an automobile frame, a leaf spring supporting said frame, a U-shaped clip extending around said spring and frame, a clip plate through which the arms of said clip extend, and nuts threaded upon said arms to hold the frame, spring and clip plate in fixed relation, said plate having an extension constituting a bracket for a fender.

2. In combination, an automobile frame, a leaf spring supporting said frame, a clip for securing said spring to said frame, and a fender bracket also secured in position by said clip.

3. In combination, an automobile frame, a leaf spring supporting said frame, a fender bracket, and a clip securely fastening together said frame, spring and bracket.

4. In combination, an automobile frame, a leaf spring, a portion of said frame overhanging said spring, a spring clip in the form of an inverted U straddling said frame and spring, a clip plate underneath said spring, and nuts upon the ends of the clip for holding the frame, spring and plate in rigid relation with each other, said clip being provided with an extension constituting a bracket for a fender.

5. In combination, an automobile frame comprising side members and end members, a leaf spring in supporting relation to one of said end members, a clip for securing said spring to said end member, and a fender bracket also secured in position by said clip.

6. In combination, an automobile frame comprising side members and end members, a leaf spring in supporting relation to one of said end members, a fender bracket and a clip securely fastening together said end member, spring and bracket.

7. In combination, an automobile frame comprising side pieces and end pieces, a leaf spring, a portion of one of said end pieces overhanging said spring, a spring clip in the form of an inverted U straddling said end piece and spring, a clip placed underneath said spring, and nuts upon the ends of the clip for holding the end piece, spring and plate in rigid relation with each other, said clip being provided with an extension constituting a bracket for a fender.

8. In an automobile having three-point spring suspension, means for attaching the spring to the frame including a clip and a clip plate for each spring, each clip plate being provided with an extension constituting a bracket for a fender.

9. In an automobile, a frame comprising side members and end members, transversely extending springs secured to said end members, and fender brackets also secured to said end members, said brackets having fender attaching means upon the side of the springs away from said frame and in substantially the same vertical planes with the side members thereof.

10. In an automobile, a frame comprising longitudinal members and an end member having converging sides, an axle, springs having their small ends pivoted to said axle and their large ends mounted in said converging sides, and means for securing said frame and the large ends of said springs together in rigid relation, said means comprising a pair of brackets adapted to support a fender.

In testimony whereof, we affix our signatures.

WILLIAM F. HARRINGTON.
FRANK C. SPEKE.